United States Patent

Hansen et al.

Patent Number: 5,832,263
Date of Patent: Nov. 3, 1998

[54] SYSTEM AND METHOD FOR IN-PLACE MODIFICATION OF INFORMATION RECORDED IN READ-ONLY STORAGE USING MODIFIABLE NON-VOLATILE STORAGE ASSOCIATED WITH AN AGENT

[75] Inventors: Karl C. Hansen, Kalamazoo; Scott A. Kammeraad, Grand Rapids, both of Mich.

[73] Assignee: DigiDox, Inc., Grand Rapids, Mich.

[21] Appl. No.: 616,331

[22] Filed: Mar. 15, 1996

[51] Int. Cl.⁶ .................................................. G06F 17/30
[52] U.S. Cl. ........................ 395/681; 395/616; 711/102; 711/112
[58] Field of Search .................................... 395/429, 430, 395/616, 681, 500; 235/380; 711/102, 103, 111, 112

[56] References Cited

U.S. PATENT DOCUMENTS

| | | | |
|---|---|---|---|
| 4,028,684 | 6/1977 | Divine et al. | 395/442 |
| 4,777,355 | 10/1988 | Takahira | 235/380 |
| 4,802,119 | 1/1989 | Heene et al. | 395/182.05 |
| 5,252,812 | 10/1993 | Nakamura | 235/380 |
| 5,408,672 | 4/1995 | Miyazawa et al. | 395/800.37 |
| 5,438,674 | 8/1995 | Keele et al. | 711/4 |
| 5,454,100 | 9/1995 | Sagane | 395/182.06 |
| 5,481,713 | 1/1996 | Wetmore et al. | 395/705 |
| 5,515,532 | 5/1996 | Iijima | 395/616 |
| 5,542,081 | 7/1996 | Geronimi | 395/800 |

*Primary Examiner*—Tod R. Swann
*Assistant Examiner*—Christopher S. Chow
*Attorney, Agent, or Firm*—Brooks & Kushman PC

[57] ABSTRACT

A system and method for allowing modification of information recorded in a read-only storage, including CD-ROMs, ROMs, read-only network directories, read-only files, and WORM media and devices (after being written or burnt.) The method and system intercepts read and write requests targetted at the read-only storage and remaps them when appropriate to a modifiable storage area. The modifying information may appear to the user to supplement, alter, or delete information recorded in the read-only storage. Information is combined from the modifiable storage and the read-only storage and presented to the user such that the entire read-only storage information need not be copied into memory.

17 Claims, 3 Drawing Sheets

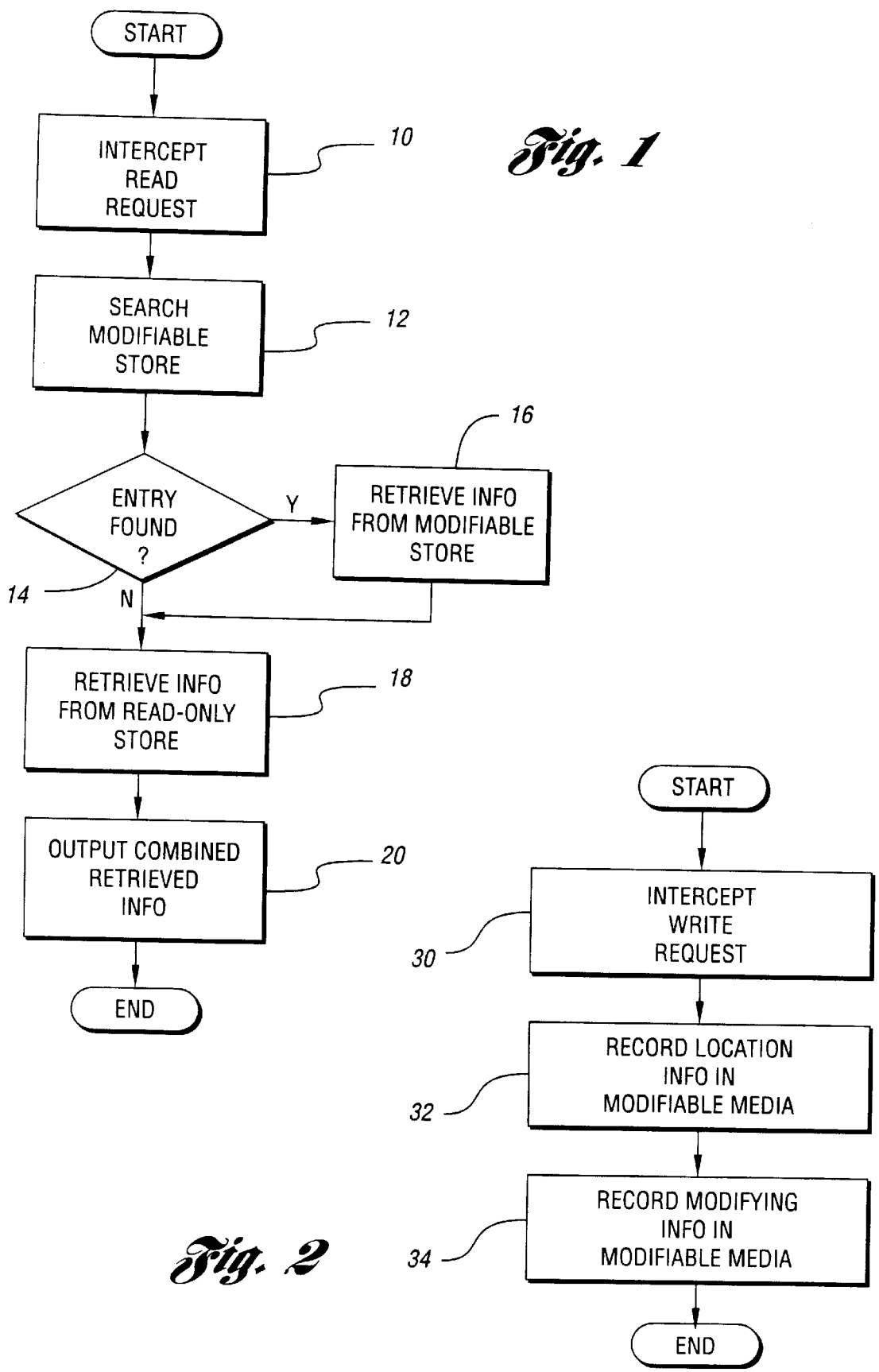

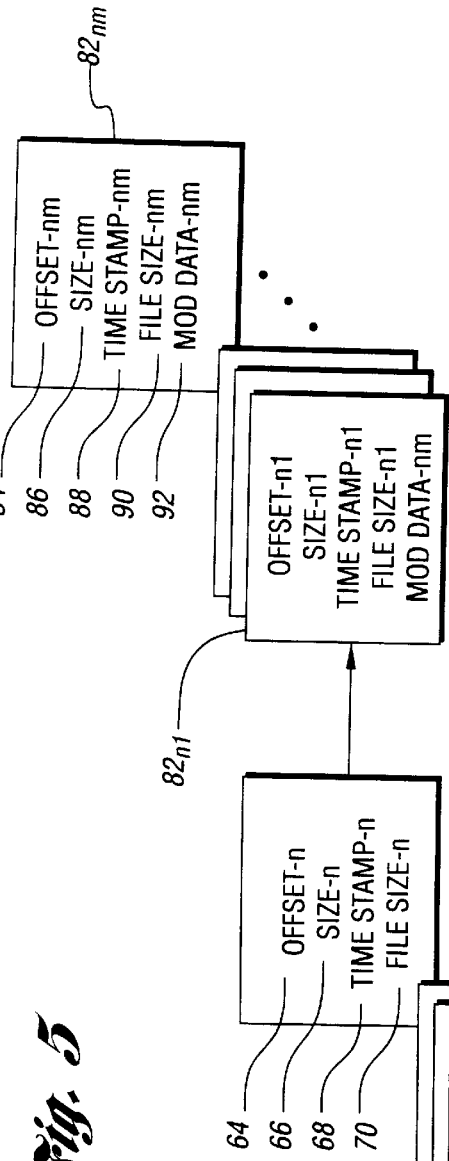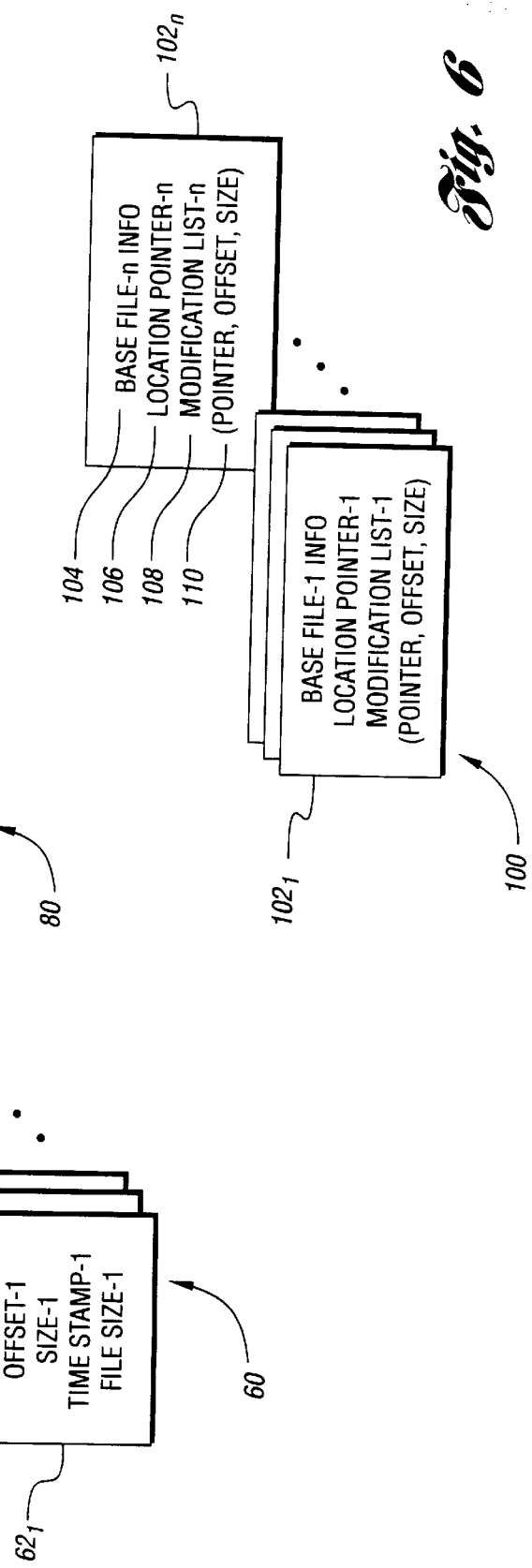

SYSTEM AND METHOD FOR IN-PLACE MODIFICATION OF INFORMATION RECORDED IN READ-ONLY STORAGE USING MODIFIABLE NON-VOLATILE STORAGE ASSOCIATED WITH AN AGENT

TECHNICAL FIELD

The present invention relates to a system and method for allowing modification of information recorded in read-only or non-modifiable store.

BACKGROUND ART

A wide variety of computers utilize information which is recorded in a non-modifiable or read-only store. The read-only limitation may be imposed to control access to the information or may be a function of the underlying storage media. For example, on a network running under the UNIX operating system, file and directory access privileges may be restricted to a designated user list to control access to the information. Such files or directories appear to be non-modifiable or read-only stores of information to those users or agents (such as other programs, daemons, systems, or the like) which do not possess the appropriate privileges. Typically, however, the characteristics of the underlying physical storage media (which may be a magnetic disk, floptical, magnetic tape, or the like) permit modifications or writing of information and are not "non-modifiable" in the strict literal sense of that term. In contrast, Read-Only Memory (ROM) devices, such as CD-ROMs, hardware ROMs, and Write Once Read Many (WORM) devices, are indeed non-modifiable stores of information; this limitation being imposed by the physical characteristics of the storage media itself.

It is often desirable to modify portions of information which may be recorded in a non-modifiable store (NMS) whether this limitation is due to the physical storage media or artificially imposed by the operating system or system administrator. Modification of information may include adding, changing, or deleting portions of the information from these stores. Prior art methods of modifying such information include copying the information from the NMS into a modifiable storage area such as Random Access Memory (RAM) and then making changes to the necessary portions. To access or to store the new information, however, the old non-modifiable copy must be replaced. This often involves physical replacement of the storage media, such as a CD-ROM, write-protected diskette, or hardware ROM.

Another prior art method which may be used to update information or data recorded in a NMS uses non-volatile memory, such as FLASH memory (which may be provided by a EEPROM, static RAM, or the like) to store updates or patches for the original information. During use, the entire original information is copied into RAM while the information stored in non-volatile memory is patched into the appropriate locations creating a modified version in RAM. This approach is limited by the size of the RAM and the size of the FLASH memory which stores the modifications. Furthermore, this approach does not provide for efficient use of memory resources when deleting information since all subsequent information must be repositioned in the FLASH memory. For example, if the NMS contains one-hundred bytes of information and the second byte is to be deleted, the FLASH memory must include bytes three through one-hundred in positions two through ninety-nine. Thus, deletion of one byte requires ninety-eight bytes of FLASH memory.

One prior art technique often used for cache memory systems stores modifications in a different location from the original information and eventually back-posts the changes to the original store. Of course, this assumes that the original data or information is recorded in a modifiable store. As such, this technique is not directly applicable to modification of information recorded in a NMS. Similarly, a prior art technique used in virtual memory systems remaps memory accesses to other locations as necessary to permit transparent access to the original information which may not fit in the available physical memory space. This technique is also not directly applicable to modification of information in a NMS because it requires temporary storage which is writable or modifiable.

DISCLOSURE OF THE INVENTION

Thus, it is an object of the present invention to provide a system and method for allowing modification of information recorded in a non-modifiable store.

It is a further object of the present invention to provide a system and method for modifying information recorded in a non-modifiable store by intercepting file accesses and redirecting them based on whether originally stored information has been updated.

Yet another object of the present invention is to provide a system and method for updating information recorded in a non-modifiable store which does not require copying of the entire original information to modify or update that information.

A still further object of the present invention is to provide a system and method for permitting in-place modification of information recorded in a non-modifiable store which reduces the amount of writable storage space required by many prior art techniques.

Another object of the present invention is to provide a system and method for in-place modification of information recorded in a non-modifiable store which allows efficient deletion of information as perceived by an agent or user.

In carrying out the above objects and other objects and features of the present invention, a method is provided for allowing modification of information recorded in a read-only store using an associated modifiable non-volatile store having at least one entry of modifying information corresponding to information recorded in the read-only store. The method includes intercepting a file access request, such as a request to read or write from or to the read-only store, and searching the associated modifiable non-volatile store for entries of modifying information corresponding to the file access. The method also includes retrieving information from the associated modifiable non-volatile store for each of the entries identified during the step of searching which contain modifying information, and retrieving information from the read-only store when the step of searching indicates that the associated modifiable non-volatile store contains no entry of modifying information corresponding to the file access. The modifying information is recorded along with associated location information which indicates a position within the read-only store to which the modifying information applies.

A system is also provided which may be used to implement a method for modifying information according to the present invention. The system includes software having control logic or rules to implement an in-place modifier module which coordinates file accesses from a read-only store and to/from a tracking store which is preferably a non-volatile modifiable storage media which is randomly accessible, readable and writable.

The advantages of accruing to the present invention are numerous. For example, the system and method of the present invention permit modification of information recorded in non-modifiable storage while efficiently using available modifiable storage. The present invention provides for in-place access to the modified or updated information without requiring copying of the entire original information into RAM. The present invention also allows supplemental information, such as annotations, to be added to information recorded in a non-modifiable store. In addition, the present invention allows the modifying information to be used to replace a portion of the information recorded in the non-modifiable store. Furthermore, information may be efficiently "deleted" from the non-modifiable store as perceived by the user. Because the present invention allows in-place modification and access to the modified information, it may be used to substantially reduce the number of occurrences for creation and installation of new NMS such as CDs, ROMs, or diskettes in order to keep information updated.

The above objects and other objects, features, and advantages of the present invention will be readily appreciated by one of ordinary skill in this art from the following detailed description of the best mode for carrying out the invention when taken in connection with the accompanying drawings.

BRIEF DESCRIPTION OF THE DRAWINGS

FIG. 1 is a flow chart illustrating one embodiment for a system or method of modifying information recorded in a non-modifiable store according to the present invention;

FIG. 2 is another embodiment for a system or method of updating information recorded in a non-modifiable store according to the present invention;

FIG. 5 illustrates additional details of the file structure depicted in FIG. 4; and FIG. 6 illustrates a data structure created in memory for one embodiment of the present invention.

BEST MODE FOR CARRYING OUT THE INVENTION

Figure 3:
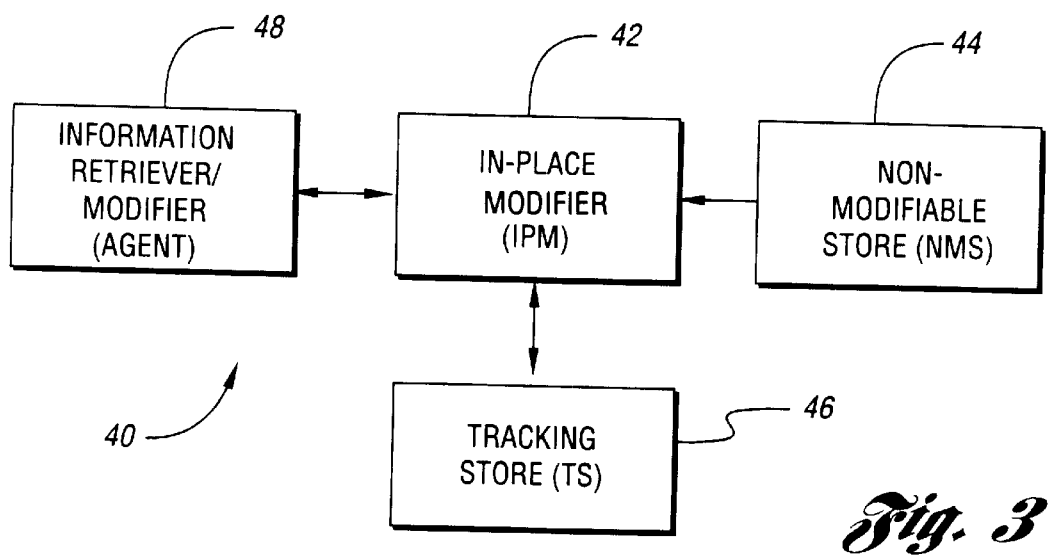
FIG. 3 is a block diagram of a system which permits modification of information recorded in non-modifiable storage according to the present invention.

Referring now to FIG. 1, a flow chart illustrating one embodiment of a system or method for allowing modification of information recorded a non-modifiable store (NMS) is shown. As used herein, "non-modifiable store (NMS)" refers to any storage which does not allow information or data to be changed whether this limitation is imposed by a physical constraint of the storage media or artificially imposed as an access control method. As such, non-modifiable stores include but are not limited to CD-ROMs, hardware ROMs, read-only network directories, read-only files, WORM media and devices (after being written or burned), write-protected diskettes, and the like. As illustrated, the system and method of the present invention intercept file accesses of the NMS and use an associated non-volatile modifiable store to track and record all modifications made to the information recorded in the NMS.

As represented by block 10 of FIG. 1, when a user or agent (such as another program, daemon, system, or the like) attempts to read information from the NMS (or read-only store), the request is intercepted. The modifiable store or media, referred to as the tracking store (TS) in one embodiment of the present invention, is searched for entries which would affect the information corresponding to the read request, as represented by block 12. If no entries are found, as represented by block 14, the read request is passed unchanged to the NMS and the information is retrieved as represented by block 18. If any entry overlaps or encompasses the information requested by the agent as indicated by block 14, the read request is diverted to the tracking store (TS) and modifying information is retrieved from the modifiable store as represented by block 16. This modifying information is used where applicable while any remaining information within the read request is retrieved from the NMS as indicated by block 18. The combined retrieved information is then output to the agent as represented by block 20. The method is preferably performed transparently to the agent such that the agent is unaware that the modifiable store has been checked or accessed.

Thus, the present invention allows modifying information to be associated with a NMS. As perceived by the agent, the modifying information may supplement, alter, or delete information from the NMS or read-only store. In the case of deletion, the modifying information may be used to suppress inclusion of particular words, phrases, graphics, or other objects when generating or rendering a page as described in greater detail below. In this embodiment of the present invention, the modifying information may be provided by an information service provider who supplies the NMS, by an update service, a Bulletin Board Service (BBS), or the like.

Another embodiment of the present invention is illustrated in the flow chart of FIG. 2. This embodiment allows the agent or user to record new information which supplements the information recorded in the NMS, to modify existing information recorded in the NMS, or to perform "virtual deletion" of information stored in the NMS such that the deleted information is unavailable to the user or agent although still physically present in the NMS. When the agent attempts to store new information or to modify the existing information, a write request is intercepted as indicated by block 30. A new entry is then recorded in the tracking store which includes any information needed to identify the affected area or areas of the NMS as indicated by block 32. This entry also includes the modifying information as represented by block 34.

Depending upon the particular implementation of the present invention, i.e. the hardware platform, operating system, file system, calling program etc., the read and write requests may be effected somewhat differently. For example, in a DOS-based or UNIX-based system, a custom device driver may be installed. Alternatively, the calling or supervisory program may provide for an optional installation of a custom filing system such as that provided for in ACROBAT EXCHANGE (TM) 2.0 as described in greater detail blow.

Depending upon the particular characteristics of the NMS, the information needed to identify the affected area in the tracking store may vary. For example, when the NMS is a byte-based device, i.e. where information is delineated by bytes of data, the information needed may be as simple as an offset representing the number of bytes from the first byte in the NMS. One example of a byte-based device is a hardware ROM. When the NMS is a file-based device, such as a write protected diskette or a computer CD-ROM, the location information needed includes the file, directory, and an offset which indicates the position within the file. Since many file-based devices can either be accessed at the file level or at the byte level, the location information represented by block 32 should be selected accordingly.

An entry as represented by blocks 32 and 34 is preferably made in the modifiable store (or tracking store) for every requested modification or addition to the NMS, even if the new modification or addition entirely replaces modifications or additions made by one or more other entries. The entries are preferably arranged so that the most recent modification of a particular area is quickly retrieved. To further improve efficiency, a table or map of modified areas may be recorded in the tracking store and updated each time a new entry is made. This would enable a quick determination of whether the modified entry list needs to be accessed in order to service a particular request. For a file-based NMS, it is often desirable to keep such a map or table for each individual file.

The tracking store or modifiable store may be implemented using any type of non-volatile modifiable store which may be as simple as a custom data file which stores the required tracking and modification information, or as complex as a relational data base. When a new version of the NMS is created, the updated information may be easily transferred from the combined image of the NMS and the TS information to the new NMS. The now superfluous TS information can either be archived or deleted once the new NMS is installed.

In a preferred embodiment of the present invention, the operation depicted by the flowcharts of FIGS. 1 and 2 are combined such that all NMS access requests are intercepted. In this embodiment, the agent is permitted to view combined information (which includes original information as recorded in the NMS and as modified by modifying information recorded in the TS) in addition to supplementing, changing, or "deleting" information.

Referring now to FIG. 3, a block diagram illustrating a system for allowing modification of information recorded in a non-modifiable store is shown. The system, indicated generally by reference numeral 40, includes an In-Place Modifier (IPM) module 42 and may also include a non-modifiable store (NMS) 44, a tracking store (TS) 46, and an information retriever/modifier (agent) 48. As can be appreciated by anyone of ordinary skill in the art, NMS 44, TS 46, or both may be a permanent part of system 40 or may be implemented with removable media. For example, in a network application where NMS 44 and TS 46 are primarily permanent, NMS 44 may be a read-only directory on a physical and/or logical network drive while TS 46 may be a custom data file on the same logical network drive or on the same physical network drive but a different logical network drive. Alternatively, TS 46 may be a floppy diskette or a local hard drive which is dedicated to a particular user. This flexibility allows multiple users to have concurrent access to documents recorded in NMS 44 while each user may insert private annotations, modifications, or deletions.

With continuing reference to FIG. 3, IPM module 42 is preferably a programmed microprocessor executing program instructions or software used to implement a method or process according to the present invention. Of course one of ordinary skill in the art will recognize that the functions of IPM module 44 could also be implemented using dedicated electrical and electronic components (sequential and/or combination logic, programmable gate arrays, microcontrollers, etc.) to execute the same or similar control logic or rules as those implemented in software in a preferred embodiment of the present invention. Similarly, various combinations of hardware and software could be utilized without departing from the spirit or scope of the present invention.

In operation, IPM module 42 performs the file system functions depicted in the flowcharts of FIGS. 1 and 2. For attempted modifications of information recorded in NMS 44, IPM module 42 creates a new entry in TS 46 which includes location tracking information (best illustrated and described with reference to FIGS. 4 and 5) and the modifying information. For file-based systems, the location tracking information recorded in TS 46 is preferably congruous to information used by the NMS file system. If a table or map is being used to track modified areas within NMS 44, then IPM module 42 also updates this map to include the most recently modified area. IPM module 42 may also provide a status report or error indication to the agent based upon whether the entry and map information were successfully created or updated in TS 46.

With continuing reference to FIG. 3, when agent 48 makes a read request, IPM module 42 checks TS 46 to determine if any portion of the request should be retrieved therefrom. This preferably includes scanning the map or table of modified areas if one is being maintained. Otherwise, IPM module 42 must scan the entire set of entries in TS 46. Based on the result of this search, IPM module 42 fetches entries from TS 46 which intersect with the storage area of the agent's requested information, and partitions the request into pieces which can be satisfied from TS 46 and pieces which are to be retrieved from NMS 44. IPM module 42 then constructs the final set of information (or image) for agent 48 by assembling the pieces from TS 46 and NMS 44 into the correct order and returns the assembled or combined information to agent 48. As with the modification requests, IPM module 42 may return a status report or error indication if requested by agent 48 based upon whether or not the full set of information was successfully constructed or not.

Figure 4:
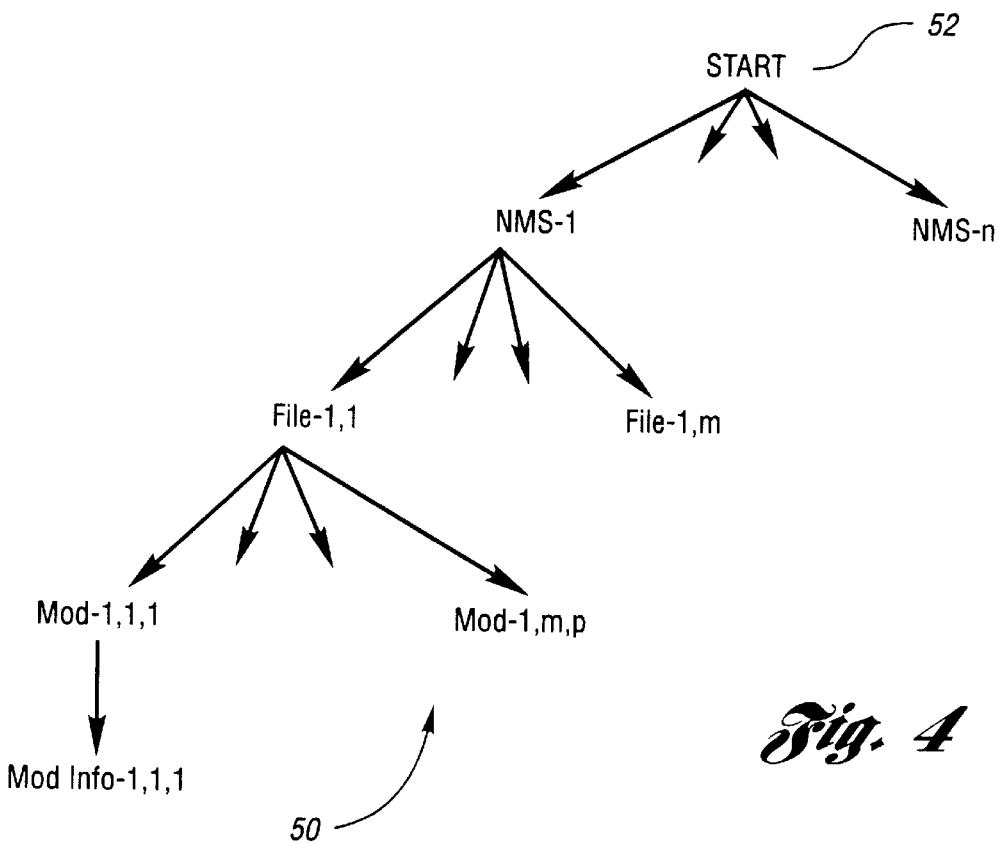
FIG. 4 illustrates a hierarchical file structure used in a tracking store (non-volatile modifiable store) of one embodiment of the present invention.

Referring now to FIGS. 4 and 5, a file structure for a tracking store of a preferred embodiment of the present invention is shown. In this embodiment, the invention was implemented as a software module or "Plug-In" that runs under the ACROBAT EXCHANGE (TM) software package developed and available from Adobe Systems Incorporated of Mountain View, Calif. As such, this embodiment was customized to track modifications to information stored in Portable Document Format (PDF). This Plug-In module is referred to as INCREMENT (TM) and is available from the assignee of the present invention.

As shown in FIG. 4, the file structure 50 for a tracking store is preferably arranged in a hierarchical or tree structure to facilitate efficient search and retrieval of modifying information. A search of the tracking store begins at the root or start location 42. For ease of illustration and explanation, only a single branch of the tree is expanded. Of course, in an actual application one or more branches may be expanded with each node having one or more subtending nodes. As also shown in FIG. 4, a separate branch is kept for each non-modifiable store (NMS-1 to NMS-n).

With continuing reference to FIG. 4, the particular embodiment illustrated was customized for file-based NMS's so that each file also has an associated sub-branch on the search tree. Alternatively, a byte-based NMS may be used as described above. Each file (File-1,1 to File-1,m) has an associated modification list (Mod-1,1,1 to Mod-1,m,p, etc.) which may have no entries, or may contain one or more modification entries (best illustrated in FIG. 5). If present, each modification entry in the list points to the associated modifying information (Mod Info-1,1,1, etc.) in the tracking store (TS). Preferably, the TS consists of a custom data file stored on a writable area of a computer's hard-drive or network drive organized in the manner illustrated. Of course, the present invention transcends the particular implementation of the TS which is provided only as an exemplary implementation.

Referring now to FIG. 5, in a preferred embodiment, the modifying information recorded within the TS includes a linked list of file entries, indicated generally by reference numeral 60. Each NMS which has been modified will have a corresponding list 60. Each file entry 62, to 62, contains the information needed to uniquely identify a particular original unmodified file recorded in a particular NMS. This information may include a filename 64, a path 66 indicating where in the directory structure the file is found, a timestamp 68 of the unmodified file, and the file size 70 of the unmodified file. This information is sufficient to allow simultaneous file tracking on multiple NMS (as depicted in FIG. 4).

Still referring to FIG. 5, each file entry 62, to 62, has an associated linked list of modification entries, indicated generally by reference numeral 80. Each modification entry 80, to 80, contains the location 84 and size 86 of a particular modification, as well as a timestamp 88 and a resulting file size 90 after the particular modification data 92 has been incorporated into the original. In this preferred embodiment, a map or table which tracks the modified areas (as described above) is not utilized.

In this embodiment, all file system accesses are intercepted, including file open, close, seek, read, write, fetch current location (tell/ftell), etc. While the read and write requests are the primary file system accesses upon which the system relies, this implementation mimics the original file system's access calls for seek and tell/ftell to provide the appearance of random access within the modified file. Since the field 90 of the file's modification list contains the file size after all modifications have been applied, seek and tell functions are easily emulated.

The location information 84 provides a pointer for the "current" location within the file. This information is stored when the file is opened and updated as needed to allow reads and writes to retrieve and modify data, respectively, based on the current location, similar to the file handle or pointer used by the native file system. Similar to the other embodiments, when a file is opened, the TS is scanned for a matching file entry indicating the presence of modifying information. If no matching entry is found, all further read requests to that file are passed unchanged to the original NMS.

Referring now to FIG. 6, an exemplary in-memory data structure for use in implementing a method according to the present invention is shown. The data structures, indicated generally by reference numeral 100 are created to facilitate tracking of the current file pointer location so that write requests are recorded in the proper location when they occur. Each data structure 102₁ to 102n includes base file information 104, a location pointer 106, and a list of modification entries 108. Each modification entry includes data, indicated generally by reference numeral 110, which contain a pointer to the modified data within the TS, an offset, and size of that data. Data structures 100 are used during the on-the-fly remapping of reads to determine whether information must be retrieved from the original NMS or from the TS. Data structures 100 corresponding to unmodified files have empty modification entry lists 108.

When a write occurs to a file recorded on one of the NMS being tracked by the system, a corresponding file entry is created in the TS if one does not exist, a modification entry is then added to the list for that file, and the in-memory data structure is updated to indicate the proper position for the current location pointer. Consecutive writes to contiguous locations are then appended together into a single modification entry. If any file accesses are made which modify the current location (such as a seek or a read), any modification entry currently being constructed is closed and subsequent writes create a new modification entry.

To facilitate multiple open files being modified in any order, the modification data may be cached to a temporary file while a modification entry is being developed. When a modification entry is closed, its corresponding modifying information or data is then copied into the TS and the TS modification list is updated.

While the best mode contemplated by the inventors for practicing the present invention has been described by means of exemplary embodiments to enable one of ordinary skill to practice the invention, the words and figures used are descriptive rather than limiting. One of ordinary skill in the art may recognize various modifications, substitutions and the like not explicitly described but which are intended to be within the scope of the invention as claimed below.

What is claimed is:

1. A method for allowing modification of information recorded in a read-only store by a plurality of agents each having an associated modifiable non-volatile store with at least one entry of modifying information corresponding to information recorded in the read-only store, the method comprising:

intercepting a read request from an agent to read from the read-only store;

searching the modifiable non-volatile store associated with the agent which generated the read request for entries of modifying information corresponding to the read request;

retrieving information from the associated modifiable non-volatile store for each of the at least one entries which the step of searching indicates contain modifying information corresponding to the read request; and retrieving information from the read-only store when the step of searching indicates that the associated modifiable non-volatile store contains no entry of modifying information corresponding to the read request.

2. The method of claim 1 further comprising:

intercepting a write request from an agent to write to the read-only store; and recording an entry in a modifiable non-volatile store associated with the agent corresponding to the write request.

3. The method of claim 2 wherein the step of recording an entry comprises recording modifying information and associated location information wherein the location information indicates a position in the read-only store to which the modifying information applies.

4. The method of claim 3 wherein the read-only store comprises information delineated by bytes and wherein the step of recording location information includes recording an offset representing a number of bytes from a first byte on the read-only store.

5. The method of claim 3 wherein the read-only store comprises information delineated by files and wherein the step of recording location information includes recording a unique filename for identifying a file and an offset for indicating a position within the file.

6. The method of claim 2 wherein the step of recording an entry comprises recording modifying information which supplements the information stored in the read-only store.

7. The method of claim 2 wherein the step of recording an entry comprises recording modifying information used to replace at least a portion of the information stored in the read-only store upon subsequent read requests.

8. The method of claim 2 wherein the step of recording an entry comprises recording modifying information used to delete at least a portion of the information stored in the read-only store upon subsequent read requests.

9. The method of claim 2 wherein the step of recording an entry comprises recording a single entry for consecutive write requests to contiguous locations of the read-only store.

10. The method of claim 1 wherein the modifiable store associated with an agent is disposed remotely from the read-only store.

11. The method of claim 10 wherein the modifiable store exists on a network.

12. A system for allowing modification of information recorded in a read-only store by a plurality of agents each having an associated modifiable non-volatile store with at least one entry of modifying information corresponding to information recorded in the read-only store, the system comprising:

control logic for intercepting a read request from an agent to read from the read-only store, searching the modifiable non-volatile store associated with the agent for entries of modifying information corresponding to the read request, retrieving information from the modifiable non-volatile store associated with the agent for each of the at least one entries which contain modifying information corresponding to the read request, and retrieving information from the read-only store when the associated modifiable non-volatile store contains no entry of modifying information corresponding to the read request.

13. The system of claim 12 wherein the control logic comprises a programmable microprocessor and wherein the control logic is further operative to intercept a write request from an agent to write to the read-only store and record an entry in the modifiable non-volatile store associated with the agent corresponding to the write request.

14. A method for allowing modification of information stored on a CD-ROM by a plurality of agents each having at least one associated file, the method comprising:

intercepting a write request from at least one of the agents to write to the CD-ROM;

modifying the at least one file associated with the agent and the CD-ROM, the file including information relative to location and content of the write request and having an enlargeable size and a hierarchical structure for tracking multiple layers of modification information;

intercepting a read request from the agent to read from the CD-ROM;

searching the file associated with the agent for entries of modifying information corresponding to the read request;

retrieving information from the file for each of the entries which the step of searching indicates contain modifying information corresponding to the read request;

retrieving information from the CD-ROM when the step of searching indicates that the file associated with the agent contains no entry of modifying information corresponding to the read request; and combining information retrieved from the file with associated information retrieved from the CD-ROM for presentation to the agent.

15. The method of claim 14 wherein the step of creating comprises creating at least two files each being stored on a different writable medium.

16. The method of claim 14 wherein at least one file is stored on a network.

17. The method of claim 14 wherein the step of creating comprises recording modifying information used to delete at least a portion of the information stored in the CD-ROM upon combining information retrieved in response to subsequent read requests.

* * * * *